Dec. 8, 1964 G. F. SHEPHERD 3,159,865
CASTER BRAKE ASSEMBLIES
Filed Sept. 28, 1961 2 Sheets-Sheet 1
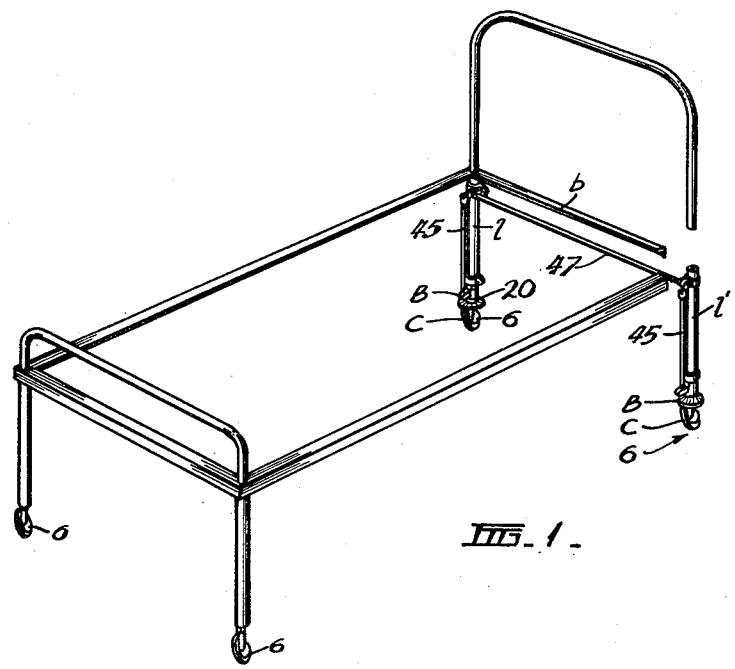
FIG. 1.
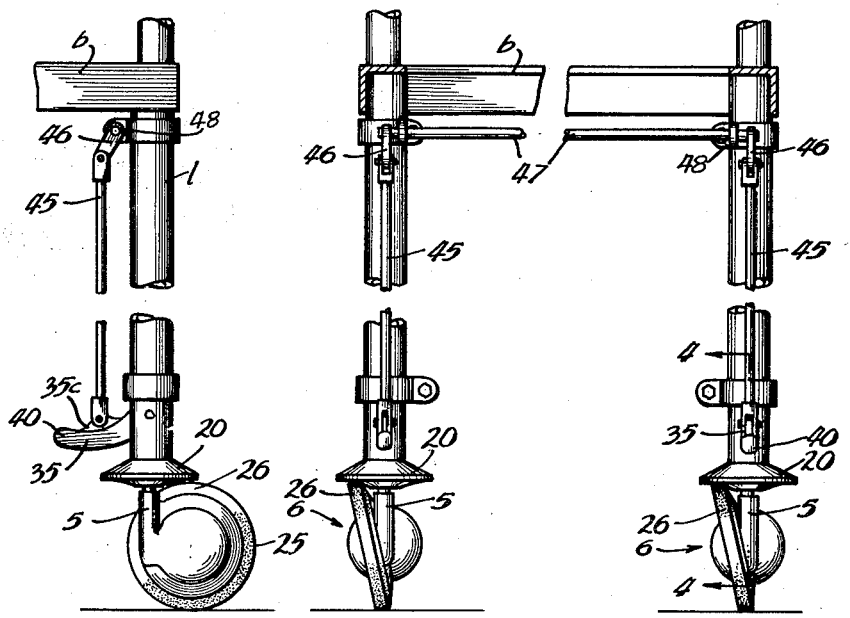
FIG. 3.
FIG. 2.
George F. Shepherd, INVENTOR
By Wenderoth, Lind & Ponack
ATTORNEYS

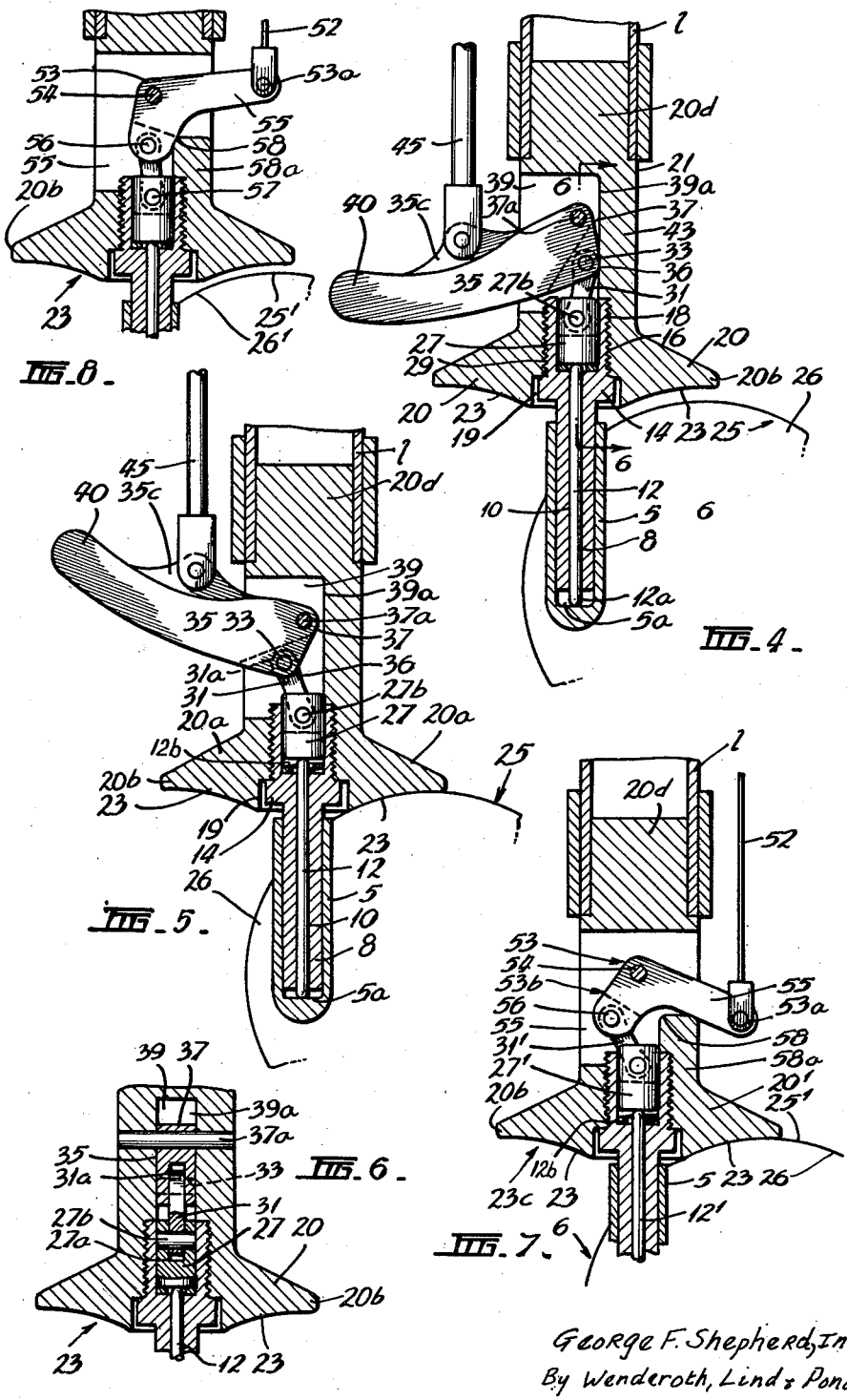

United States Patent Office 3,159,865
Patented Dec. 8, 1964

3,159,865
CASTER BRAKE ASSEMBLIES
George Frederick Shepherd, 11 Manor St.,
Brighton, Victoria, Australia
Filed Sept. 28, 1961, Ser. No. 141,360
Claims priority, application Australia, Oct. 5, 1960,
65,298/60
7 Claims. (Cl. 16—35)

This invention relates to a caster and brake assembly for use with hospital bedsteads and is directed to such an assembly including the type of caster the subject of my United States Patents Nos. 2,484,189 and 2,539,108 and my pending application for United States Letters Patent Serial No. 856,723, now Patent No. 3,054,135.

While the above casters in particular and conventional casters in general provide for the free mobility of a hospital bed, there are occasions when the latter should remain fixed or stationary and this may be difficult to achieve in a free running multi caster mounting. For instance, hospital beds must be maintained stationary while a patient is lifted in or out of the bed, consequent upon the now general hospital practice to maintain the patient in his or her own bed while being transported to and from an operating theatre or the other hospital location.

For that and other purposes many hospital beds are equipped with a jacking system operable to lift one end of the bed off the floor, to facilitate careful removal of the patient, such systems have to be built into the framework of the bed, to thus add materially to the cost of the bed.

Certain industrial casters have brakes fitted to the caster wheel, but they do not prevent the caster from swivelling, whereby a degree of unrestrainable free movement of the attached machine is permitted when the brake is "on" or applied. Moreover, with the brake applied to the wheel or roller only, the actuating lever or the like controlling the brake has a full circle of movement, to stop on occasions in a relatively inaccessible position in which it is difficult for the user to operate the brake.

It is the principal objective of the invention to provide an effective brake for a caster to constitute with the latter a unitary assembly for convenient attachment to a leg of a hospital bedstead, and having the desired characteristic of providing unobstructed mobility and free castering movements when the brake is "off," and convenience in controlling or applying the brake component to maintain the attached bedstead supported by the caster, stationary in the required position or location against all movement until the release of the brake.

It is a further objective of the invention to provide such a brake and caster assembly for a hospital bedstead utilizing a caster of the type specified without the requirement of any material structural variation in the caster.

The accompanying drawings depict a number of practical arrangements of a caster brake assembly according to the invention for application to the leg of a bedstead.

In these drawings:

FIGURE 1 is a perspective view of a bedstead illustrating a caster brake assembly for the front legs of the bedstead.

FIGURE 2 is an enlarged side elevation of a caster and brake assembly upon one of the front legs of the bedstead.

FIGURE 3 is a fragmentary enlarged front elevation of the brake and caster assembly for the abovementioned legs.

FIGURE 4 is an enlarged section taken on the line 4—4 of FIGURE 3 with the brake "off."

FIGURE 5 is a similar view in section showing the brake "on."

FIGURE 6 is a section taken on line 6—6 of FIGURE 4.

FIGURES 7 and 8 are views in section of a modified brake construction showing the brake "on" and "off" respectively.

Referring now to the drawings the swivel socket bearing 5 of the complete caster 6 of the type specified has inserted therein the vertical pivot or swivel pin 8 having an axial bore or passage 10 to receive a plunger rod 12, the inner end 12a of which projects out of the pivot pin 8 to contact the bottom 5a of the socket bearing 5.

The swivel pin 8 externally of the socket bearing 5 is formed with a cylindrical enlarged head 14 having an outer threaded reduced section 16 for engagement with a threaded section 18 in the bore 19 of the brake indicated generally at 20 which is coaxial with the swivel pin 8 of the caster as viewed in FIGURES 2 and 3.

The body 21 of the brake 20 is cylindrical with the inner end 20a flared in frusto conical form with a coaxial brake forming flange 20b concentric with the head 14 of the coaxial swivel pin 8. The flange 20b in this arrangement consists of an annulus 23 of arcuate partly convex section of a radius to provide a frictional brake surface complementary to the shape of the surface of the tread 25 of the floor engaging roller 26 of the caster 6 as shown in FIGURE 2.

The shape or contour of the brake surface 23 is shaped to conform to and fit the contour or shape of the tread of the floor engaging roller whilst allowing for its offset position in relation to the pivot swivel pin 8 of the caster. Accordingly the brake forming flange 20b is disposed a predetermined distance above the flange of the tread 25 of the floor engaging roller 26, and the annulus forming the frictional brake surface ensures that braking contact will be established between said surface and tread in any position of the latter.

The plunger rod 12 is separate and at the top bears against a plunger 27 disposed in slidable relation with an end enlarged coaxial portion 29 of the axial passage 10, located in the threaded section 16 of the head 14 of the swivel pivot pin 8. A spring washer 12b is mounted upon the plunger rod 12 in the bottom of the end portion 29 of the passage 10, for location between the plunger 12 and head 14 of the swivel pin.

As viewed in FIGURE 6 the plunger 27 has a central recess 27a in the top in which is pivotally connected as at 27b, the inner end of a toggle link 31, the other end 31a of which is centrally offset relatively to pivot 27b and pivotally connected as at 33 to a somewhat L shaped lever 35 about the junction or heel 36 of the leg and foot. The upright or upwardly projecting foot 37 of the lever 35 is pivoted as at 37a within a rectangular radial or part diametrical recess 39 in the cylindrical body 21 of the brake, the lever 35 having its leg 40 externally disposed for foot control by the user.

The foot 37 of the lever 35 is pivoted as at 37a in substantial vertical alignment with the pivot point 27b between the toggle link 31 and plunger 27, whereby the toggle link 31 assisted by the spring washer 12b provides a snap-over movement for the lever 35. The spring washer maintains the toggle link and lever at all times under compression even when the caster is momentarily relieved of weight upon an uneven floor. There is a stop for the lever 35 constituting the inner wall 39a of the radial recess 39 in the body 21 of the brake, to contact the heel 36 of said lever 35 in one position of the toggle link 31, i.e. when the brake is "off" as viewed in FIGURE 4.

The above lever 35 is apertured as at 35c to receive the coupling rod 45 of a control lever associated with a similar brake indicated generally at B and associated with a caster C on the opposite front leg 1' of the bedstead as illustrated in FIGURE 1 to simultaneously operate the brake B. To that end each coupling rod 45 connected to a control lever 35 is at the upper end, pivotally connected to a link 46 pivotally connected to a transverse spindle 47 journalled in the collars 48—upon the legs 1—1' of the bedstead b.

Thus upon the operation of the lever 35 of one brake 20, a complementary movement of the particular coupling rod 45 will actuate the connected link 46 so as to turn the spindle 47 in a direction to impart the same movement to the coupling rod 45 of the other associated brake to operate the lever of the latter and resultantly simultaneously operate said associated brake. The brake caster assembly B–C is identical in construction and operation as the assembly hereinafter described with reference to FIGURES 2 to 6.

The upper or outer end 20d of the brake body 21 is attached to the leg 1 of the bedstead by any convenient means to suport the leg upon the caster and brake assembly hereinafter described.

Referring now to FIGURE 4 it will be observed that the brake flange 20b is shown clear of the tread 25 of the floor engaging roller 26, with the leg 40 of the lever downwardly inclined slightly from its pivot point 37a and the heel 36, and the toggle link 31 engaging the stop 39a as shown in FIGURE 4 to thus maintain the brake in the "off" position. To apply the brake, the leg 40 of the lever 35 is raised by the foot of the user and the resistance provided by the plunger rod 12 contacting the bottom 5a of the socket bearing 5, overcomes the resistance to movement by the toggle link 31 consequent upon its off centre disposition relatively to aligning pivots 27b and 33 of the lever and plunger, whereby the toggle link 31 is pivotally drawn to its other off centre position by the movement of said lever, to release and thus permit the brake body 20 to gravitationally drop and bring the brake flange 23 into contact with the tread 25 of the floor engaging roller 26 as viewed in FIGURE 5.

The weight of the bed leg 1 and bedstead b is supported by, and transmitted directly through the brake body and flange to the tread 25 of the floor engaging roller 6 to lock the latter against relative rotary or swivelling movements about the pivot swivel pin 8. Thus the bedstead is locked to the caster whereby the latter is restrained against all movement either rotary or castering, and this restraint is made positive in multi caster assembly by coupling a pair of levers 35 for movement in unison as hereinbefore described with reference to FIGURE 1.

The brake forming flange 20b is moved off the tread 25 by depressing the leg 40 of the raised lever 35 to thereby move the toggle link 31 inwardly from the position shown in FIGURE 5 towards that in FIGURE 4, to bring the heel 36 of said lever into contact with the stop wall 39a. The resultant pressure applied through the plunger 27 and plunger rod 12 to the bottom 5a of the socket bearing 5 imparts a reverse and upward movement to the brake body 21 sufficient to disengage the brake forming flange 20b from the tread 25 of the floor engaging roller 26, to again assume the "off" position shown in FIGURE 4. In this position the offset position of the toggle pivot 33 relatively to the aligning lever and plunger pivots 37a and 27b respectively in conjunction with the engagement of the heel 36 of the lever 35 with the stop wall 39 retains in the brake "off."

The foot operable lever 35 above described with reference to FIGURES 1 to 6 enables the brakes to be left at will in the "on" or "off" position.

In an alternative construction of brake component the foot operated lever 35 is eliminated and a single hand lever (not shown) is mounted in a convenient position on the top rail at either end of the bedstead. Under this arrangement the brakes are normally maintained, applied or "on" and can only be released by an operator gripping the above hand lever to release the brake or brakes to move the bed, and immediately the grip is released the brake or brakes are automatically applied to the floor engaging roller.

To that end, referring now to FIGURES 7 and 8 the control lever is replaced by a bell crank 53 with the outer limb 53a pivotally connected to the depending Bowden wire 52 or the like which is connected at the other end to the abovementioned hand lever for effecting the operation of the bell crank 53. The bell crank is pivotally connected as at 54 to the body 20' of the brake within the transverse rectangular opening 55 in said body.

The inner limb 53b of the bell crank 53 is pivotally connected to the outer end of the toggle line 31' out of axial alignment with the pivot point 54 of the bell crank, the inner end of the toggle link 31' being pivotally connected as at 57 to the plunger 27' in alignment with said pivot point 54 of the bell crank 53, the relative arrangement of the pivot points of the bell crank 53, toggle 31' and plunger 27' being generally the same as hereinbefore described with reference to FIGURES 3 and 4.

The relative offset pivotal disposition of the toggle link 31' with the bell crank 53 as shown in FIGURE 7 is such to normally restrain movement of the bell crank so as to maintain the brake 23 "on" i.e. in contact with the tread 25' of the floor engaging roller 26' under the downwardly directed pressure arising from the weight of the leg and bedstead carried by the caster, as viewed in FIGURE 7.

When the hand lever is gripped by the operator to release the brake the Bowden wire exerts an upward pull upon the limb 53 of the bell crank to raise the said limb to about the horizontal position shown in FIGURE 8 to bring the inner end of the limb 53b of said bell crank against the stop 58 formed by the inner side of the shoulder 58a in the diametrical opening 55 in the body of the brake.

In this position shown in FIGURE 8 it will be observed that the relative disposition of the pivot 56 of the toggle link and bell crank to the pivot points 54 and 57 is such that the movable pivot 56 of the toggle 31' link is just outside the center line between the pivot 54 of the bell crank 53 and lever pivot 57 of the toggle 31'. This permits the operative to hold the brake "off" by a relatively light grip upon the hand lever, but upon release of the latter and resultant relief of the pull the Bowden wire 52 the toggle link 31' under the weight of the legs and bedstead will return to the position shown in FIGURE 7 to permit the gravitational movement of the brake body from the position shown in FIGURE 8 to again apply the brake forming flange to the tread 25' of the floor engaging roller 26.

I claim:

1. A unitary caster and brake assembly for a hospital bedstead comprising a caster body having a floor engaging roller and an internal vertical swivel bearing, a vertical swivel pin supported in and projecting from said bearing, a brake body coaxial with said swivel pin for attachment at the outer end to a leg of a bedstead to be supported by said caster, said brake body being axially movable relative to said caster and having a frictional brake surface at its inner end coaxial with said pin and shaped to contact with the tread of said floor engaging roller in any relative position of said roller, and means in said brake body, operable at will to cooperate with said caster to release said brake body in an "off" position for weight imposed relative axial movement to apply said brake surface to the tread of said roller to prevent both rotary and swivelling movements of said caster, and to raise said brake body for return of the latter to the "off" position.

2. A unitary caster and brake assembly for a hospital bedstead comprising a caster having a hollow body including a floor engaging roller and a vertical bearing within said body, a swivel pin in said bearing supported to project upwardly and outwardly from said bearing, a brake body coaxially mounted upon said swivel pin and axially movable relative to said caster, means for attaching the outer end of said brake body to a leg of a bedstead to be supported by said caster, said brake body having at its inner end a brake forming flange concentric with said swivel pin having a frictional brake surface contactable with the tread of said floor engaging roller in any relative position of the latter, and means in said brake body operable at will to cooperate with said caster to effect the relative axial movement of said brake body between respectively an "off" position with said brake surface located in spaced relation to the tread of said roller, and an "on" position with said brake surface applied in weight imposed contact to said tread.

3. A unitary caster and brake assembly for a hospital bedstead comprising in combination a caster having a hollow body including a floor engaging roller and a vertical swivel pin supported in and projecting from a socket bearing in said caster, a brake body having a recess coaxially mounted upon said swivel pin for axial movement relatively to said caster, means for attaching the outer end of said brake body to the leg of a bedstead to be supported by said caster, the inner end of said brake body having a frictional brake surface coaxial with said swivel pin to contact the tread of said floor engaging roller, a lever member pivotally mounted within said recess for angular movement at will, a toggle link pivotally connected at one end to said lever member within said recess and pivotally mounted at the other end below and in substantial axial alignment with the axis of said lever to cooperate with said swivel pin and bearing to effect the relative axial movement of said brake body in response to the operation of said lever member, and a stop in said recess to limit the movement of said lever in a direction to retain the frictional brake surface in an "off" position relatively to the tread of said roller, movement of said lever member in a reverse direction releasing said brake body for axial movement to effect the weight imposed application of said brake surface to said tread.

4. A caster and brake assembly for a hospital bedstead including a caster having an associated brake and comprising in combination an inclined axle, a hollow body including a floor engaging roller mounted for rotation upon said inclined axle, a vertical socket bearing in said body, a swivel pin slidable within and projecting from said bearing, a brake body coaxial with and secured to said swivel pin, means for attaching the outer end of said brake body to a leg of a bedstead to be supported by said caster, said brake body having at its inner end a brake forming flange concentric with said swivel pin and contactable with the tread of said floor engaging roller, said swivel pin having an axial passage extending therethrough with an enlarged outer end portion and said brake body having a vertical side opening in communication with said outer end portion, a lever member projecting into said vertical opening and pivoted within the latter to said brake body for angular movement at will, the end wall of said opening forming a stop to limit the angular movement of said lever member in one direction, a toggle link pivotally connected at one end to said lever member below the pivot axis of the latter, a coactive member having a head disposed in slidable relation within said axial passage and pivotally connected to the other end of said toggle link in coaxial alignment with the pivot axis of said lever member, said coactive member having an axial extension projecting through said swivel pin to contact the bottom of the socket bearing.

5. A caster and brake assembly for a hospital bedstead comprising an inclined axle, a caster having a hollow body including a floor engaging roller mounted for rotation upon said inclined axle, a vertical socket bearing in said caster body, a hollow swivel pin slidable within and projecting from said bearing, a brake body coaxial with and secured to said pin, means for attaching the outer end of said brake body to a leg of a bedstead to be supported by said caster, said brake body having at its inner end a brake forming flange coaxial with said swivel pin and contactable with the tread of said floor engaging roller, said brake body having an opening in communication with the upper end of said hollow swivel pin, a bell crank lever pivotally mounted within said opening with one limb projecting from the latter, means connected to said projecting limb to angularly move said lever, a toggle link pivotally connected at one end within said opening to the other internal limb of said lever, a coactive member disposed in slidable relation within said hollow swivel pin and pivotally connected to the other end of said toggle link in coaxial alignment with the pivot axis of said bell crank lever, said member having an extension projecting through said swivel pin to contact the bottom of said socket bearing, said body having a part of the wall defining said opening forming a stop to limit the extent of movement of said internal limb responsive to the operation of said means, in a direction to locate the brake flange in an "off" position relatively to the tread of said roller whereby upon release of said means by the operative, the brake body describes a gravitational movement to impart a weight imposed application of the brake forming flange to the tread of said roller.

6. A caster and brake assembly for a hospital bedstead comprising an inclined axle, a caster having a hollow body including a floor engaging roller mounted for rotation upon said inclined axle, a vertical socket bearing in said caster body, a hollow swivel pin slidable within and projecting from said bearing, a brake body having a recess coaxial with and secured to said hollow swivel pin, means for attaching the outer end of said brake body to the leg of a bedstead to be supported by said caster, said brake body having at its inner end a brake forming flange concentric with said swivel pin axis and contactable with the tread of said floor engaging roller, a lever member pivotally mounted within and projecting from said recess for angular movement at will, a support member for said swivel pin pivotally connected to said lever member and freely projecting through said hollow swivel pin to contact the bottom of said socket bearing, and a stop to limit the movement of said lever member in one direction, the relative disposition of the pivot axis of said lever member and its pivotal connection to said support member being such that in the position of engagement of said lever member with said step, said lever member retains said brake flange in an "off" position, and in another position permits the relative slidable movement of said brake body and pin upon the support member to effect a weight imposed application of said brake flange to the tread of said roller.

7. A caster and brake assembly for a hospital bedstead comprising an inclined axle, a caster having a hollow body including a floor engaging roller mounted for rotation upon said inclined axle, a vertical socket bearing in said body, a swivel pin slidable within and projecting from said bearing, a brake body coaxial with and secured to said swivel pin, means for attaching the outer end of said brake body to a leg of a bedstead to be supported by said caster, said brake body having at its inner end a brake forming flange coaxial with said swivel pin and contactable with the tread of said floor engaging roller, said swivel pin having an axial passage extending therethrough with an enlarged outer end portion and said brake body having a vertical side opening in communication with said enlarged outer end portion, a lever member projecting into said vertical opening and pivoted within the latter to said brake body for angular movement at will, the end wall of said opening forming a stop to limit the angular movement of said lever member in one direction, a toggle link pivotally connected at one end to said lever member below the pivot axis of the latter, a support member for said swivel pin having a head freely fitting an enlarged complemental portion in said axial passage, and an extension projecting through said passage to contact the bottom of said bearing, the head of said support member being pivotally connected to the other end of said toggle link in coaxial alignment with the pivot axis of said lever member the engagement of which with said stop retains said brake element spaced from the tread of said roller, whereby movement of said lever in the other direction releases said brake body for relative slidable movement upon said support member to effect weight imposed application of said brake flange to said tread of said roller.

References Cited in the file of this patent

UNITED STATES PATENTS

| | | |
|---|---|---|
| 1,116,086 | Lewis | Nov. 3, 1914 |
| 2,539,108 | Shepherd | Jan. 23, 1951 |
| 2,631,329 | McKean | Mar. 17, 1953 |
| 2,950,121 | Fisher | Aug. 23, 1960 |